(12) United States Patent
Tsabari

(10) Patent No.: US 6,270,664 B1
(45) Date of Patent: Aug. 7, 2001

(54) WATER TREATMENT SYSTEM

(76) Inventor: Yigal Tsabari, Moshav Tsalafon 83 (IL), 99750

( * ) Notice: Subject to any disclaimer, the term of this patent is extended or adjusted under 35 U.S.C. 154(b) by 0 days.

(21) Appl. No.: 09/427,613

(22) Filed: Oct. 27, 1999

(30) Foreign Application Priority Data

Oct. 27, 1998 (IL) .......................................... 126775

(51) Int. Cl.⁷ .................. C02F 9/00; C02F 5/08
(52) U.S. Cl. .................. 210/206; 210/209; 210/262; 210/697
(58) Field of Search .................. 210/206, 209, 210/261, 262, 697

(56) References Cited

U.S. PATENT DOCUMENTS

| | | | |
|---|---|---|---|
| 1,484,073 | * | 2/1924 | Morrison . |
| 3,442,800 | * | 5/1969 | Jasionowski . |
| 3,542,199 | * | 11/1970 | Bray . |
| 3,554,377 | * | 1/1971 | Miller . |
| 3,815,747 | * | 6/1974 | Clack et al. . |
| 4,210,624 | * | 7/1980 | Price . |
| 4,293,425 | * | 10/1981 | Price . |
| 4,626,350 | * | 12/1986 | Reid . |
| 4,944,875 | * | 7/1990 | Gaignet . |
| 5,643,444 | * | 7/1997 | Garrigues et al. . |
| 6,096,197 | * | 8/2000 | Hughes . |
| 6,132,611 | * | 10/2000 | Yuen . |

FOREIGN PATENT DOCUMENTS

| | | | |
|---|---|---|---|
| 432906 | * | 6/1991 | (EP) . |
| 1593460 | * | 7/1970 | (FR) . |
| 2105664 | * | 4/1972 | (FR) . |
| 2788511 | * | 7/2000 | (FR) . |

* cited by examiner

Primary Examiner—Thomas M. Lithgow
(74) Attorney, Agent, or Firm—Mark M. Friedman

(57) ABSTRACT

An apparatus for treatment of water comprising a first compartment containing a filtration unit for receiving untreated water, a second compartment containing polyphosphates, a housing containing the first compartment and the second compartment, and a polyphosphate dosing unit comprising a partition between said first compartment and said second compartment, an inlet tube, affixed to the partition, allowing a small portion of water filtered in the first compartment to flow into the second compartment containing polyphosphates, an outlet tube, affixed to the partition, from which the flow of polyphosphate-containing water is drawn out of the second compartment by the Venturi effect, wherein the filtration unit in the first compartment produces filtered water, the major portion of which, other than said small portion of water flowing into said second compartment, being discharged without contacting polyphosphates, such that the amount of polyphosphate distributed in the water is substantially proportional to the amount of said filtered water.

12 Claims, 5 Drawing Sheets

PRIOR ART

WATER TREATMENT SYSTEM

FIELD AND BACKGROUND OF THE INVENTION

The present invention relates to the improvement of water quality in both domestic and industrial settings, and, in particular, to an apparatus using chemical and physical means for improving water quality by inhibiting the formation of rust and scale and by filtering particulate matter from the water.

Municipal and industrial waters contain objectionable impurities, commonly referred to as hardness, which are the cause of processing problems such as scaling. Scaling is usually due to the presence of calcium and magnesium salts in the water. In both natural and industrial waters, these salts are present in various forms, including the relatively soluble calcium and magnesium bicarbonates ($Ca(HCO_3)_2$ and $Mg(HCO_3)_2$). Upon heating, carbon dioxide is released, precipitating calcium and magnesium carbonates ($CaCO_3$ and $MgCO_3$). Since the scale forms more rapidly when water is heated, the problem of scaling is particularly troublesome in water heaters and hot water systems.

The scale precipitation is predominantly on the available surface area—the inner surfaces of the pipes, coils and collecting tanks, boilers, cooling towers, shower walls, glass, sinks, etc., and upon existing layers of scale previously deposited on said surfaces. The hardness of the scale greatly promotes the attrition of faucets, valves, and pumps. Scale formation is the main problem affecting water-heating plants, in both domestic and industrial settings, causing serious operating problems and increasing utility and/or maintenance costs.

Of the many methods of water treatment, treatment with polyphosphates is potentially one of the most simple, effective and economical ways of solving the problems caused by water hardness, and is effective at temperatures up to about 80° C. The action of the polyphosphate is based on the ability of polymer phosphates to be absorbed by the peripheral surfaces of calcite and magnesite crystallization nuclei, hence forming a protective film that prevents the nuclei from bonding together and thereby preventing the precipitation that causes scale deposits. Thus, even though water treated with polyphosphates retains the original hardness, the formation of damaging incrustations caused by calcareous deposits is inhibited.

Polyphosphates also work on the inner metal surfaces of the piping system, forming a very fine protective film that insulates the surfaces and protects them against corrosion.

A method and apparatus for dispensing polyphosphates in industrial applications is known. The feed water flows through a bed containing polyphosphate particles. Since the concentration of dissolved polyphosphate depends on the water flow rate, such a dosing system cannot ensure a relatively constant polyphosphate concentration. Health considerations have prompted various regulatory agencies to place an upper limit of 5 mg/liter on the polyphosphate content in municipal water, hence this method is not the most suitable for drinking water and similar domestic applications.

Industrial systems are often very sensitive to particulate matter in the water. The above method does not relate to the presence of insoluble matter in the feed water, and, in addition, the dispensing of polyphosphate results in the entrainment of polyphosphate particles which actually increases the amount of particulate matter in the water. The problem is particularly acute at high flowrates. As a result, an additional filtration unit must be installed to prevent damage to processes and to process equipment.

A method and apparatus for dispensing polyphosphates in municipal water (i.e., drinking water quality) is known. The apparatus features a suction device that operates by means of preset calibrated nozzles and exploits the so-called Venturi effect. Thus, the bulk of the feed water flows through the system without contacting the polyphosphate. Only a side stream containing small proportion of the water flows into a compartment containing the polyphosphate crystals. The residence time and contacting conditions are such that the water becomes essentially saturated with polyphosphate before rejoining the main flow of water. Since the mixing of the polyphosphate-saturated with the main flow of water is proportional to the water flow rate, the concentration of dissolved polyphosphate in the treated water discharged from the system is supposed to be fairly constant.

The utility of the known apparatus is, however, severely hampered by several characteristic problems and limitations. Small polyphosphate crystals suspended in the water in the polyphosphate compartment can be drawn into the main flow of water discharge from the system. In addition to raising the level of particulate matter in the treated water, the concentration of dissolved polyphosphate in the treated water is subject to unpredictable fluctuations and surges due to the entrainment of the polyphosphate crystals.

Moreover, as the solution leaving the polyphosphate compartment is sucked through a tiny orifice by the main flow of water being discharged from the apparatus, the presence of entrained polyphosphate crystals or other particulate matter can eventually lead to a blockage of the orifice, thereby impairing or "inhibiting" the function of the apparatus. It is also known that fine polyphosphate crystals can cause damage to the O-ring of the apparatus, resulting in water leakage and impairing efficiency.

There is therefore a need for a method and apparatus for dispensing the polyphosphate which are more reliable manner than those known heretofore, such that the quality of the product water and the performance of the apparatus are substantially improved. It would also be greatly advantageous to have an apparatus that would combine the dispensing of polyphosphate with filtration in a more compact and efficient manner than known heretofore.

SUMMARY OF THE INVENTION

It is an object of the present invention to provide an apparatus for the addition of polyphosphates to water for domestic and industrial usage that substantially reduces the formation of scale and corrosion and is reliable and easy to operate and maintain, thereby remedying characteristic problems of the prior art.

It is yet another object of the present invention is to provide a water treatment apparatus for municipal water applications in which the addition of polyphosphates and the filtering of undesirable particulate matter are effected efficiently in one compact vessel.

It is yet another object of the present invention is to provide a water treatment apparatus for industrial water applications in which the addition of polyphosphates and the filtering of undesirable particulate matter are effected efficiently in one compact vessel, and wherein the filtering unit improves the performance of the polyphosphate dosing unit.

The above and other objects are achieved by the apparatus according to the present invention, which combines the polyphosphate dispensing operation with a filtration operation in one compact unit. The filter inhibits entrained polyphosphate crystals from being discharged with the treated water, and removes other forms of particulate matter as well. The apparatus is designed such that the available surface area for effecting the filtration is extremely large, such that the filter performs reliably and is not prone to blockage. Moreover, since the water passing through the filter is unsaturated, polyphosphate particles trapped by the filter eventually dissolve instead of building up.

According to the teachings of the present invention there is provided an apparatus for water treatment particularly suited to municipal water applications, the apparatus comprising a first compartment containing a filtration unit for receiving untreated water, a second compartment containing polyphosphates, a housing containing said first compartment and said second compartment, a polyphosphate dosing unit comprising a partition between said first compartment and said second compartment, at least one inlet tube, affixed to said partition, allowing a small portion of water filtered in said first compartment to flow into said second compartment containing polyphosphates, at least one outlet tube, affixed to said partition, from which flow of polyphosphate-containing water is drawn out of said second compartment, wherein said filtration unit in said first compartment produces filtered water, the major portion of said filtered water, other than said small portion of water flowing into said second compartment, being discharged without contacting polyphosphates, and wherein said flow of polyphosphate-containing water is withdrawn from said second compartment through said at least one outlet tube by the flow of said major portion of said filtered water creating a low pressure zone, such that the amount of polyphosphate distributed in the water is substantially proportional to the amount of said filtered water.

Further provided is an apparatus for water treatment particularly suited to industrial water applications, said apparatus comprising a compartment containing a filtration unit, a compartment containing polyphosphate particles, a housing for both compartments, a partition dividing the compartments, and at least one inlet tube passing through the partition and supplying feed water to the polyphosphate-containing compartment, wherein substantially all of the feed water enters said compartment containing polyphosphates before passing through said filtration unit, and wherein the partition directs flow from the polyphosphate-containing compartment to the feed side of the filtration unit.

In the specification and claims section below, the determination that the concentration of dissolved polyphosphate in the treated water is "substantially constant with changes in flow rate", the determination that the amount of polyphosphate distributed in the water is "substantially proportional to the amount of the filtered water", and the like, refer to a $P_2O_5$ concentration within the range of about 1 mg/liter to about 5 mg/liter for flow rates exceeding 1 m³/h, and to a $P_2O_5$ concentration of less than 5 mg/liter for flow rates below 1 m³/h.

BRIEF DESCRIPTION OF THE DRAWINGS

The principles and operation of the water treatment system according to the present invention, as well as the advantages of the system relative to known art, may be better understood with reference to the drawings and the accompanying description, wherein.

DESCRIPTION OF THE PREFERRED EMBODIMENTS

According to the teachings of the present invention there is provided an apparatus for water treatment particularly suited to municipal water applications, the apparatus comprising a first compartment containing a filtration unit for receiving untreated water, a second compartment containing polyphosphates, a housing containing said first compartment and said second compartment, a polyphosphate dosing unit comprising a partition between said first compartment and said second compartment, at least one inlet tube, affixed to said partition, allowing a small portion of water filtered in said first compartment to flow into said second compartment containing polyphosphates, at least one outlet tube, affixed to said partition, from which flow of polyphosphate-containing water is drawn out of said second compartment, wherein said filtration unit in said first compartment produces filtered water, the major portion of said filtered water, other than said small portion of water flowing into said second compartment, being discharged without contacting polyphosphates, and wherein said flow of polyphosphate-containing water is withdrawn from said second compartment through said at least one outlet tube by the flow of said major portion of said filtered water creating a low pressure zone, such that the amount of polyphosphate distributed in the water is substantially proportional to the amount of said filtered water.

Further provided is an apparatus for water treatment particularly suited to industrial water applications, said apparatus comprising a compartment containing a filtration unit, a compartment containing polyphosphate particles, a housing for both compartments, a partition dividing the compartments, and at least one inlet tube passing through the partition and supplying feed water to the polyphosphate-containing compartment, wherein substantially all of the feed water enters said compartment containing polyphosphates before passing through said filtration unit, and wherein the partition directs flow from the polyphosphate-containing compartment to the feed side of the filtration unit.

Figure 1:
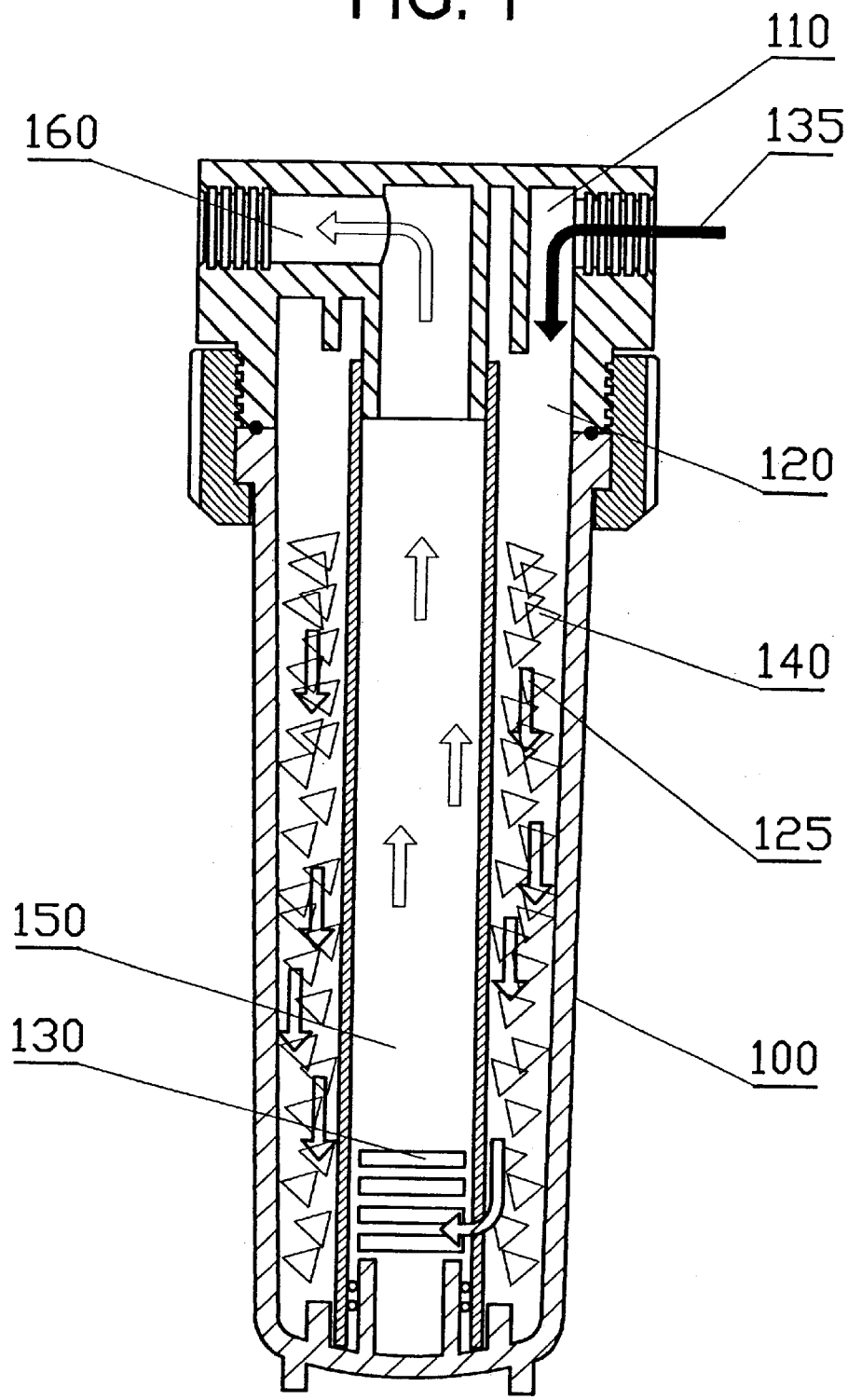
FIG. 1 illustrates an apparatus according to known art with non-proportional dosing.

Referring now to the drawings, FIG. 1 illustrates a water treatment apparatus with non-proportional dosing according to the known prior art. The apparatus is typically used for treating industrial water.

The apparatus features a cylindrical housing 100 with a central tube 150 along the length of the cylinder. The annular region around the tube 120 is loaded with polyphosphate particles to form an annular polyphosphate bed 140. Feed water 135 enters the unit via the inlet chamber 110, which leads into the annular region 115. As the water flows down 125 through the polyphosphate bed 140, a minute amount of polyphosphate is dissolved. At the bottom of the bed 140, the polyphosphate-containing water enters the central tube 150 via a slitted grating 130, and is discharged from the unit from the outlet chamber 160.

Figure 2:
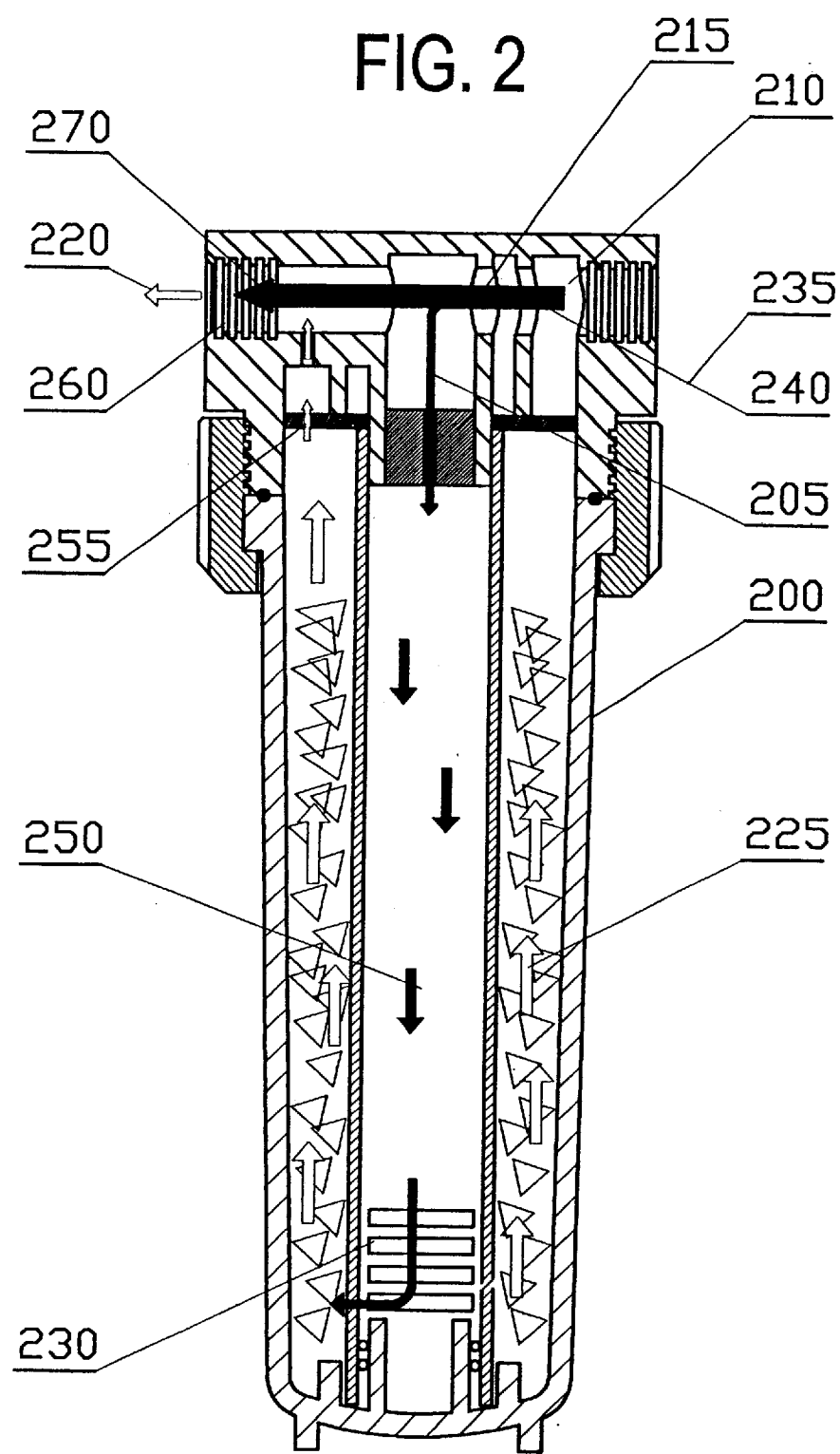
FIG. 2 illustrates an apparatus according to known art with proportional dosing.

FIG. 2 illustrates a water treatment apparatus with proportional dosing according to the known prior art. The apparatus is typically used for treating municipal (drinking-quality) water. The feed water 235 enters the unit via the inlet chamber 210. The inlet chamber narrows suddenly at 215, creating a high-pressure zone. The pressure forces a very small portion of the water to pass through a narrow orifice 205 and into the central tube 250 running parallel to the length of the housing cylinder 200. At the bottom of the tube 250, the water enters the annular polyphosphate bed 240 via a slitted grating 230. As the water flows up 225 through the bed 240, polyphosphate is dissolved. Since the flow rate is extremely low, the residence time is high enough for the water to become substantially saturated with respect to polyphosphate. The polyphosphate-saturated water flows into the outlet chamber 260 via a narrow orifice 255. The high velocity of the main water flow 270 passing by the orifice creates a low-pressure zone, drawing a relatively small flow of polyphosphate-saturated water through the orifice 255 and into the main stream 270. Thus, under ideal conditions, the amount of dissolved polyphosphate in the outlet stream 220 is roughly proportional the water flow rate, such that concentration of dissolved polyphosphate is relatively constant. It should be noted that in this design, the bulk of the feed water flows through the system without contacting the bed of polyphosphate particles.

Figure 3:
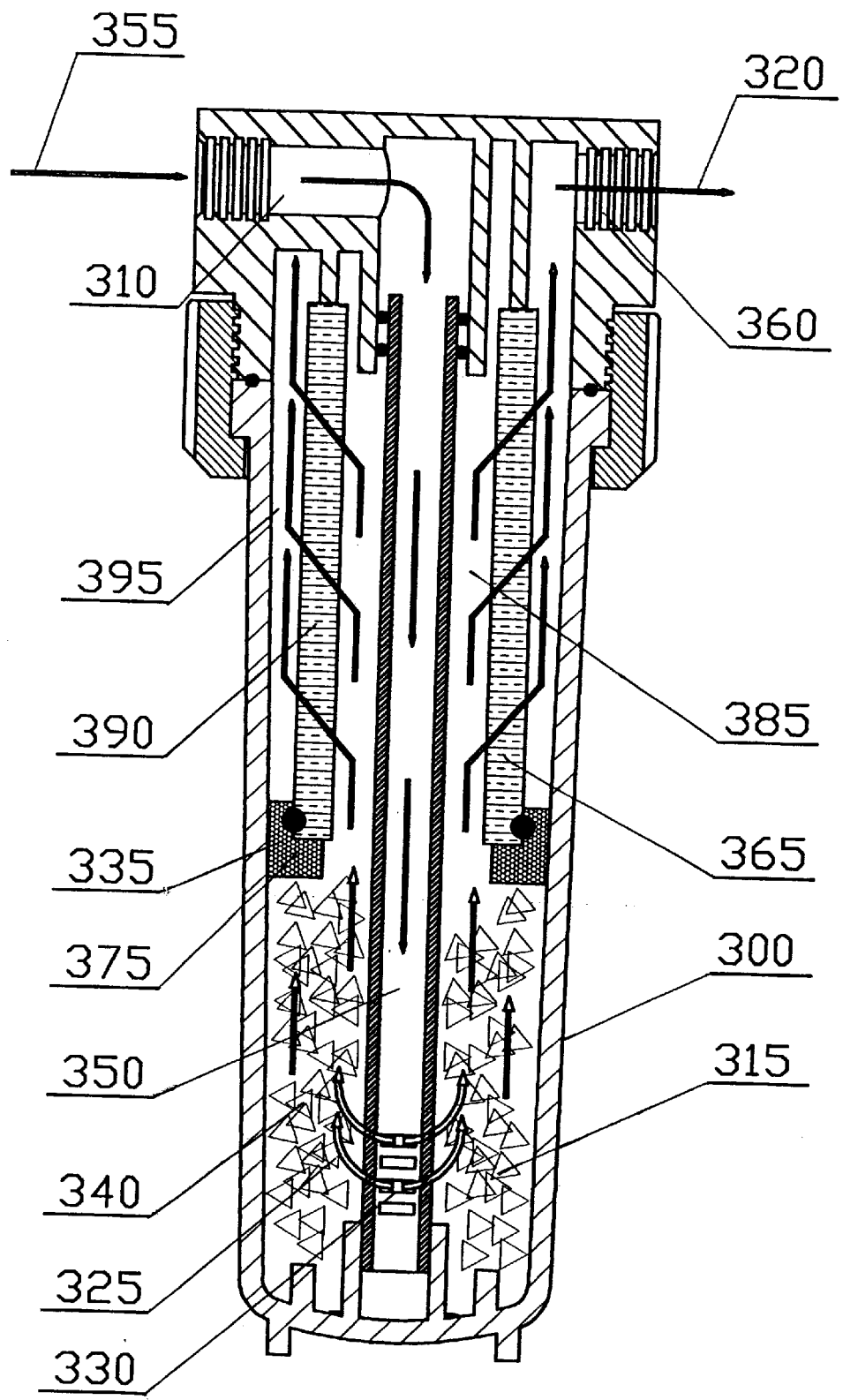
FIG. 3 is a schematic drawing of one embodiment of an apparatus according to the present invention containing an integrated filtration unit, and in which the entire stream of water is contacted with the bed of polyphosphate crystals.

FIG. 3 illustrates an embodiment of the apparatus according to the present invention containing an integrated filtration unit, and in which the entire stream of water is contacted with the bed of polyphosphate crystals. The apparatus features a cylindrical housing 300 with a central tube 350 along the length of the cylinder. The annular region around the tube 320 is loaded with polyphosphate particles to form a bed 340. Feed water enters the unit via the inlet chamber 310, which leads into the central tube 350. At the tube bottom 350, a slitted grating 330 allows the water to enter the annular region 320 containing the polyphosphate bed 340. The water passing through the bed 340 dissolves a small amount of polyphosphate. Above the polyphosphate bed 340 is fixed a partition 375, dividing between the polyphosphate bed compartment 315 and the filtration compartment 365 above. The partition 375 is in the shape of a ring, with ample clearance space provided for both the central tube 350 and for the upwards-flowing stream 335 containing dissolved polyphosphate.

The stream containing dissolved polyphosphate enters the inner annulus 385 of the filtration compartment, bounded by the central tube and by the inside of the cylindrical screen 390. The water passes through the screen 390, leaving behind insoluble matter and entrained polyphosphate particles.

The filtered, polyphosphate-containing water flows up 305 through the outer annulus of the filtration compartment 395 and is discharged from the unit from the outlet chamber 360.

In a preferred embodiment, the polyphosphate particles are subsequently dissolved by the flow of water, which is highly unsaturated with respect to polyphosphate, such that the filter is substantially self-cleaning with respect to polyphosphate particles.

In a preferred embodiment, the flow in the filtration unit operates in the outward radial direction. In another preferred embodiment, the partition between the polyphosphate compartment and the filtration compartment is built such that flow through the partition is in the outer region of the compartment, such that the filtration unit operates in the inward radial direction.

In a preferred embodiment, the filtration unit includes a screen.

In another preferred embodiment, the filtration unit includes a ring disc filter. The filters can be washable, partially-washable or disposable, and can be manufactured from conventional materials of construction according to conventional fabrication techniques.

The partition dividing between the filtration compartment and polyphosphate compartment can be installed in the water treatment device or alternatively, the partition can be manufactured/cast as part of the housing unit. Similarly, the central tube can be installed in the water treatment device or cast as part of the housing unit.

The polyphosphate particles can be filled from the top. Alternatively, the water treatment device can be produced with a removable bottom, such that filling and refilling of the polyphosphate bed is facilitated.

Figure 4:
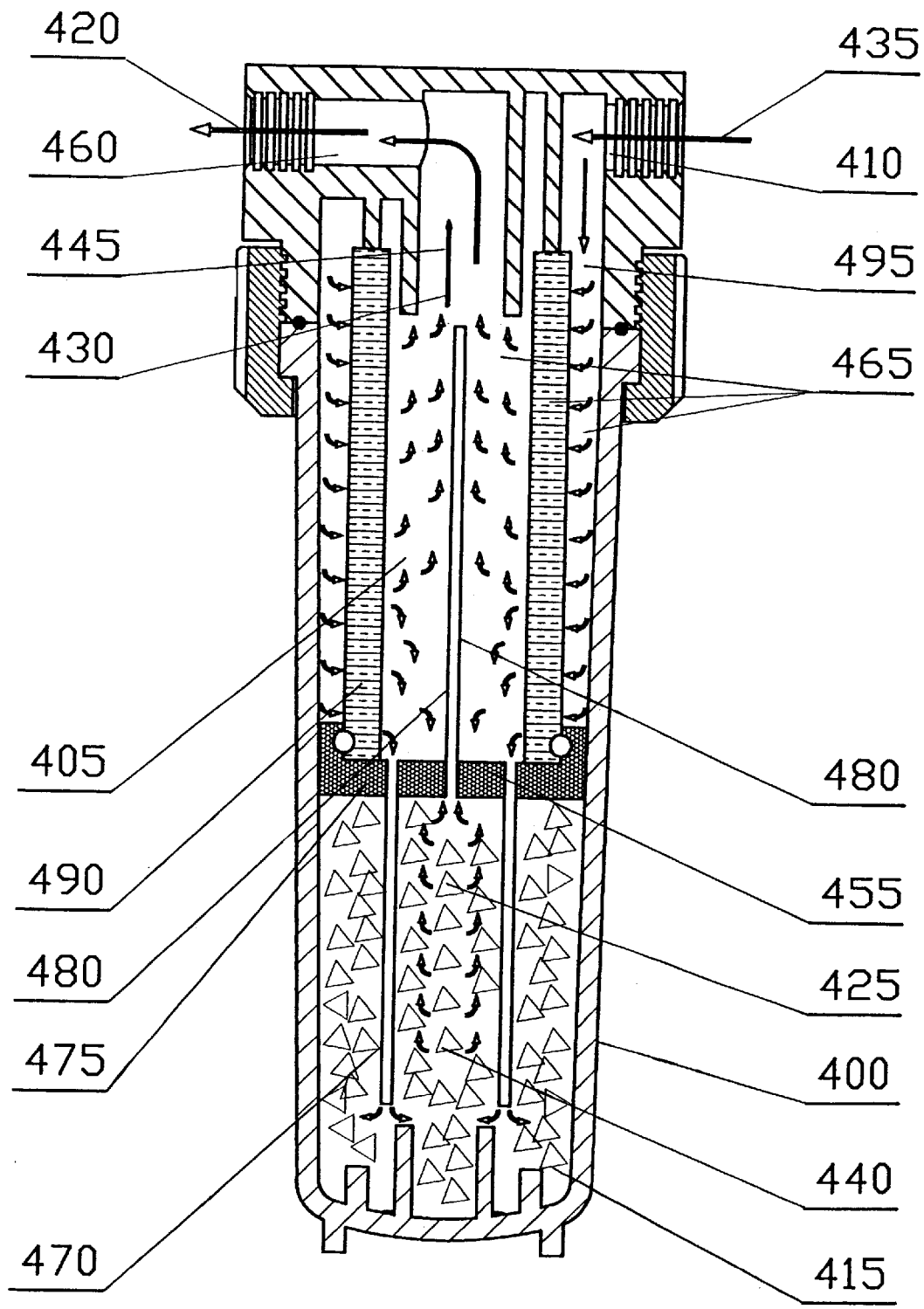
FIG. 4 is a schematic drawing of one embodiment of apparatus for filtering liquids according to the present invention, with a polyphosphate dosing unit, an improved Venturi design and an integrated filtration unit.

FIG. 4 illustrates another embodiment of an apparatus for filtering liquids according to the present invention, with an improved Venturi design and with an integrated filtration unit. The feed water enters the unit via the inlet chamber 410 and flows into the outer annulus 495 of the filtration compartment 465 bounded by the housing 400 wall and a cylindrical-shaped filter cartridge 490. The filter removes particulate matter above a specified characteristic size from the feed water. The bulk of the filtered water 405 exits the water treatment unit via the outlet chamber 460 without having contact with the polyphosphate particles. A small portion 455 of the filtered water passes through the tubes 470 affixed to the partition 475 and leading into the polyphosphate compartment 415. The water flows up 425 through the polyphosphate bed 440, dissolving polyphosphate, and exits the compartment through a narrow tube 480 running parallel to the length of the cylinder.

In the improved Venturi design, the high velocity of the main water stream 480 flowing by the mouth of the tube creates a low-pressure zone, drawing a relatively small flow of polyphosphate-containing water out of the tube 430 and into the main stream 445 in a co-current fashion. Thus, the polyphosphate dosing system is designed such that the amount of dissolved polyphosphate in the outlet stream 420 is proportional to the water flow rate, yielding a concentration of dissolved polyphosphate that is relatively insensitive to changes in flow rate.

The tube diameters are preferably selected such that at high flow rates, the solution drawn out of the polyphosphate compartment through the central tube is undersaturated. Thus, instead of accumulating and blocking the entrance to the central pipe, the adhering polyphosphate particles are eventually dissolved.

Figure 5:
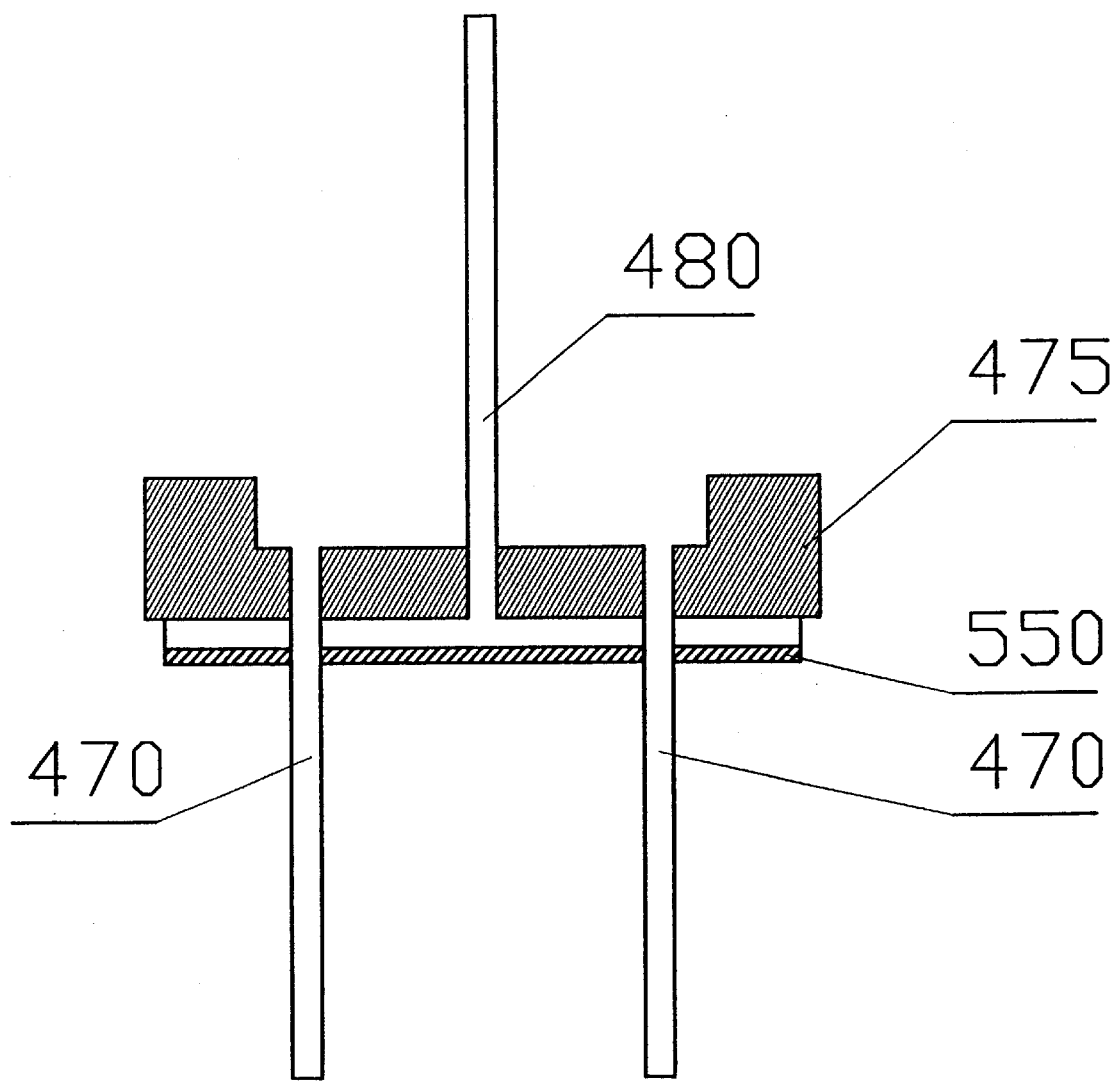
FIG. 5 is a more detailed side view of a preferred embodiment of the polyphosphate dosing unit provided in FIG. 4, in which a filter has been attached to the bottom of the partition.

The structure of the polyphosphate dosing system according to one preferred embodiment is provided in more detail in FIG. 5. The system is based on a disc-shaped partition 475 that divides the above-mentioned filtration compartment 465 and polyphosphate compartment 415. The partition also provides the requisite mechanical strength for the filter cartridge unit. Three tubes are attached and pass through the partition 475. As explained above, the high velocity of the main water stream 445 flowing by the mouth of the tube 480 and co-current to the tube creates a low-pressure zone, drawing a relatively small flow of polyphosphate-containing water out of the tube and into the main stream. In turn, filtered feed water is drawn from the filtration compartment to the polyphosphate compartment through the two lower tubes 470.

A screen 550 is attached to the bottom side of the partition disc. The screen stops the entrainment of polyphosphate particles in the treated water flowing out of the system.

Thus, a preferred embodiment further comprises an additional filtration unit that substantially prevents entrained polyphosphate particles from contaminating the treated water. In another preferred embodiment, the additional filtration unit is substantially self-cleaning.

While it is clear that tiny polyphosphate particles can pass through filtering media and enter the stream of treated water, the complete removal of polyphosphate particles from the treated water is not required. Tiny polyphosphate particles do not cause damage to faucets, fittings and the like; their contribution to the concentration of polyphosphate in the water is insignificant, neither do they play a major role in water turbidity. Hence, as used herein in the specification and claims section below, the "prevention of entrained polyphosphate particles from contaminating water" and the like refer to the above-mentioned removal of coarse polyphosphate particles by filtering and dissolution, with the optimal filter type and pore or mesh size being dependent on operating conditions and the type and quality of the polyphosphate particles.

In a preferred embodiment, the filtration unit operates in the inward radial direction.

In another preferred embodiment, the filtration unit includes a ring disc filter or other conventional cartridge filters.

The present invention is an apparatus that combines the dispensing of polyphosphate in water with filtration in one compact unit. The filtration inhibits entrained polyphosphate crystals from being discharged with the treated water, and removes other forms of particulate matter as well. The apparatus is designed such that the available surface area for effecting the filtration is extremely large, such that the filter is not at all prone to blockage. Moreover, since the water passing through the filter is unsaturated, trapped polyphosphate particles eventually dissolve instead of building up.

While the invention has been described with respect to a limited number of embodiments, it will be appreciated that many variations, modifications and other applications of the invention may be made.

What is claimed is:

1. Apparatus for treatment of water comprising:
   (a) a first compartment containing a filtration unit for receiving untreated water;
   (b) a second compartment containing polyphosphates;
   (c) a housing containing said first compartment and said second compartment;
   (d) a polyphosphate dosing unit comprising:
      (i) a partition between said first compartment and said second compartment;
      (ii) at least one inlet tube, affixed to said partition, allowing a small portion of water filtered in said first compartment to flow into said second compartment containing polyphosphates;
      (iii) at least one outlet tube, affixed to said partition, from which flow of polyphosphate-containing water is drawn out of said second compartment;

wherein:
      A. said filtration unit in said first compartment produces filtered water, the major portion of said filtered water, other than said small portion of water flowing into said second compartment, being discharged without contacting polyphosphates;
      B. said flow of polyphosphate-containing water is withdrawn from said second compartment through said at least one outlet tube by the flow of said major portion of said filtered water creating a low pressure zone, such that the amount of polyphosphate distributed in the water is substantially proportional to the amount of said filtered water.

2. Apparatus according to claim 1, wherein said filtration unit operates in the inward radial direction.

3. Apparatus according to claim 1, wherein said filtration unit includes a screen.

4. Apparatus according to claim 1, wherein said filtration unit includes a ring disc filter.

5. Apparatus according to claim 1 further comprising additional filtration unit that substantially prevents entrained polyphosphate particles from contaminating said treated water.

6. Apparatus according to claim 5, wherein said additional filtration unit is substantially self-cleaning.

7. Apparatus for water treatment, said apparatus comprising:
   (a) a first compartment containing a filtration unit;
   (b) a second compartment containing polyphosphates;
   (c) a housing containing said first compartment and said second compartment;
   (d) a partition separating said first compartment and said second compartment;
   (e) at least one inlet tube supplying feed water to said second compartment and passing through said partition;
   wherein substantially all of said feed water enters said second compartment before undergoing filtration in said first compartment, and wherein said partition directs flow from said second compartment to the feed side of said filtration unit.

8. Apparatus according to claim 7, wherein said filtration unit is substantially self-cleaning with respect to polyphosphate particles.

9. Apparatus according to claim 7, wherein said filtration unit operates in the outward radial direction.

10. Apparatus according to claim 7, wherein said filtration unit operates in the inward radial direction.

11. Apparatus according to claim 7, wherein said filtration unit includes a screen.

12. Apparatus according to claim 7, wherein said filtration unit includes a ring disc filter.

* * * * *